(12) United States Patent
So (10) Patent No.: US 8,552,872 B2
(45) Date of Patent: Oct. 8, 2013

(54) TRANSMITTER FOR ANIMAL TRAINING DEVICE CAPABLE OF SWITCHING BETWEEN RHEOSTATIC MODE AND INTENSITY SELECTION MODE

(76) Inventor: Min Jae So, Seoul (KR)

( * ) Notice: Subject to any disclaimer, the term of this patent is extended or adjusted under 35 U.S.C. 154(b) by 239 days.

(21) Appl. No.: 13/240,069

(22) Filed: Sep. 22, 2011

(65) Prior Publication Data

US 2013/0076516 A1   Mar. 28, 2013

(51) Int. Cl.
*G08B 23/00* (2006.01)
(52) U.S. Cl.
USPC ..................... 340/573.3; 340/573.1
(58) Field of Classification Search
USPC ....................................................... 340/573.3
See application file for complete search history.

(56) References Cited

U.S. PATENT DOCUMENTS

| 6,474,269 | B2 * | 11/2002 | So | 119/720 |
| 7,111,586 | B2 * | 9/2006 | Lee et al. | 119/719 |
| 8,181,607 | B2 * | 5/2012 | Kim | 119/720 |

* cited by examiner

*Primary Examiner* — Kerri McNally
(74) *Attorney, Agent, or Firm* — John K. Park; Park Law Firm (57) ABSTRACT

A transmitter for animal training device capable of switching modes between a rheostatic mode and an intensity selection mode is provided. Switching from rheostatic mode to intensity selection mode is done by fitting a select knob to a volume switch, setting a mode selection switch to a vibrations mode, and operating both an adjust mode select switch and a power switch at the same time. When in intensity selection mode, a user is able to adjust the volume level in multiple stages. When the select knob is fitted to the volume switch and is rotated, a ball plunger engages in grooves of the select knob, so that the select knob is stopped at the volume level a user desires. With adaptation of the select knob or volume knob to the volume switch, vibrations or shock level are adjusted in rheostatic mode or intensity selection mode.

9 Claims, 13 Drawing Sheets

TRANSMITTER FOR ANIMAL TRAINING DEVICE CAPABLE OF SWITCHING BETWEEN RHEOSTATIC MODE AND INTENSITY SELECTION MODE

BACKGROUND OF THE INVENTION

1. Field of the Invention

The present invention relates, in general, to a transmitter for an animal training device capable of switching between a rheostatic mode and an intensity selection mode and, more particularly, to a transmitter for an animal training device in which when a control mode switch is operated, a volume switch is switched between a rheostatic mode and an intensity selection mode so that the level of vibrations or shocks adjusted by the volume switch can be controlled in the rheostatic or intensity selection modes.

2. Description of the Related Art

Generally, animal training devices are devices that are mounted around a neck or part of a body of an animal to apply electric shocks or vibrations to the animal to train the animal. The level of the vibrations or electric shocks applied is adjusted by a level adjusting switch attached to the transmitter of an animal training device.

Figure 1:
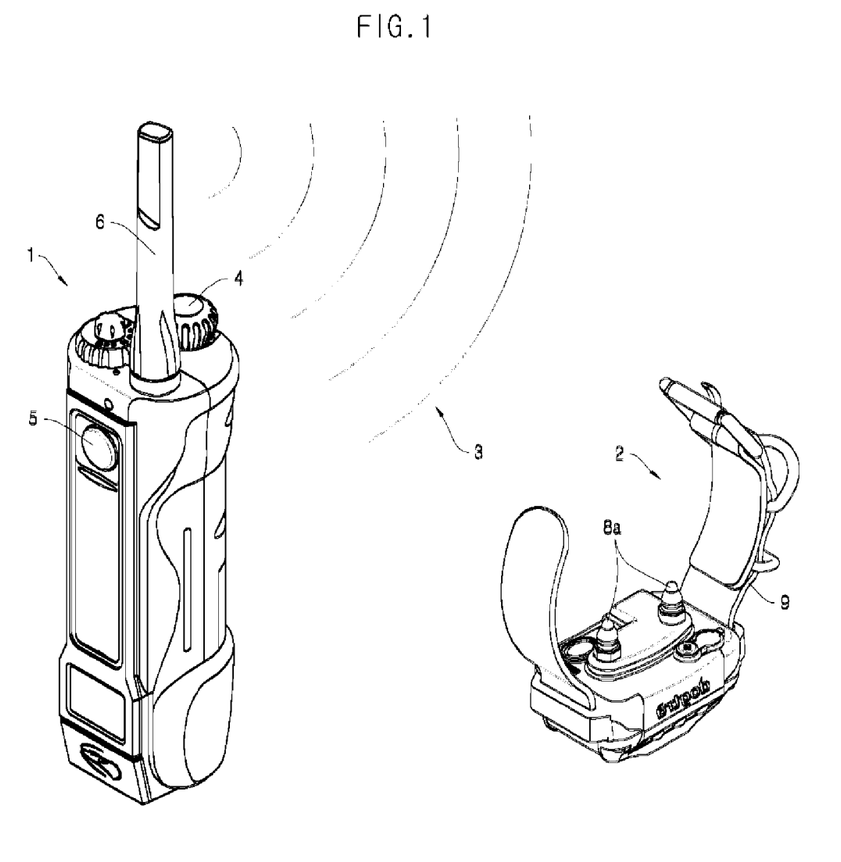
FIG. 1 is a view showing a transmitter and receiver constituting a conventional animal training device.

The animal training device illustrated in FIG. 1 includes a transmitter 1 and a receiver 2. The transmitter 1 transmits a radio signal 3 to an animal to apply electric stimulation to the animal according to a trainer's manipulation.

The transmitter 1 includes a level adjusting switch 4 that sets a level of shock waves output from the receiver 2, a transmit switch 5 that enables a radio signal 3, which contains indication information about the level of shock waves set by the level adjusting switch 4, to be transmitted, and a transmit antenna 6 that transmits the radio signal including the indication information about the level of shock waves set by the level adjusting switch 4 and ID code information about corresponding receiver.

The receiver 2 includes an electrode 8a that is fixedly mounted inside a collar 9 of the receiver so as to receive the radio signal 3 from the transmit antenna 6 of the transmitter 1 and apply the electric shock waves to an animal in the level set by the level adjusting switch 4.

The level adjusting switch 4 of the related art is configured so that a variable terminal is brought into contact with a stationary terminal, such that when a user turns an adjust knob 4a in a clockwise or counterclockwise direction, the level of shock waves is controlled in proportion to a turning angle of the adjust knob.

That is, the conventional level adjusting switch 4 is constructed as a variable resistor (i.e. volume switch) which adjusts the levels only for rheostatic mode, in which the level is input according to contact resistance between the stationary terminal and variable terminal.

However, the conventional level adjusting switch is problematic because when a user tries to adjust the level quickly, the level is adjusted incorrectly. This is because despite the level being adjusted in proportion to the degree the adjust knob is turned, it is difficult for a user to turn the level adjusting switch quickly using his fingers to an accurate degree corresponding to the level desired by the user.

SUMMARY OF THE INVENTION

Accordingly, the present invention has been made keeping in mind the above problems occurring in the related art, and the present invention is intended to propose a transmitter for an animal training device, in which a select knob is fitted to a volume switch to turn an operation mode to an intensity selection mode adjusting and displaying the level of vibrations or shocks in multiple stages, and a volume knob is fitted to convert the operation mode to a rheostatic mode adjusting and displaying the level in a smooth manner, thereby being capable of switching between the rheostatic mode and the intensity selection mode.

Further, the present invention is intended to propose a transmitter for an animal training device capable of switching modes between a rheostatic mode and an intensity selection mode, in which a select knob is fitted to a volume switch to allow the level of vibrations or shocks to be adjusted and displayed in multiple stages, thereby enabling a user to quickly adjust the level.

In order to achieve the above objects, according to one aspect of the present invention, there is provided a transmitter for an animal training device including: a mode selection switch selecting a mode of vibration, shock, or illumination; a volume switch setting the level of vibrations or shocks output from a receiver; a display unit displaying the level of vibrations or shocks set with the volume switch; an adjust mode select switch selectively switching to either intensity selection mode, which sets the level of vibrations or shocks set by the volume switch in multiple stages, or rheostatic mode, which sets the level of vibrations or shocks set by the volume switch to a digitalized value; a radio transmit unit transmitting a radio signal, including data about the level of vibrations or shocks currently set by the volume switch, to the receiver; and a transmit controller controlling the display unit to display, in intensity selection mode or rheostatic mode, the level of vibrations or shock currently set by the volume switch according to the intensity selection mode or rheostatic mode selected by the adjust mode select switch, and controlling the radio transmit unit to transmit, to the receiver, the radio signal including the data about the level of vibrations or shock currently set by the volume switch.

In an exemplary embodiment, when the adjust mode select switch is set to intensity selection mode, the transmit controller converts a voltage value input from the volume switch into a digital value, compares the digital value with a plurality of predetermined multi-stage ranges and converts the digital value into a set level value corresponding to a specific stage range, and displays the set level value on the display unit.

In an exemplary embodiment, when the adjust mode select switch is set to rheostatic mode, the transmit controller converts a voltage value input from the volume switch into a digital value, and display the digital value on the display unit in a decimal format.

In an exemplary embodiment, the adjust mode select switch is switched to either intensity selection mode or rheostatic mode when the mode select switch is set to vibration mode in the state of the volume switch having the level of "0", and the adjust mode select switch and a power switch are operated at the same time.

In an exemplary embodiment, the volume switch is configured to be mounted on an upper surface of a main body of the transmitter such that a ball plunger is mounted near the volume switch in such a manner as to be fixedly engaged in a plurality of dome type grooves formed in an undersurface of the select knob.

In an exemplary embodiment, a knob protrusion is provided on an undersurface of the select knob and a circular recess having a stopper is formed in an upper surface of a main body of the transmitter around a knob axis of the volume switch such that in the circular recess, the select knob is able to rotate in one direction to the maximum level at one end of the stopper, and to rotate in the other direction to the minimum level at the other end of the stopper.

In an exemplary embodiment, the ball plunger is configured such that when the select knob rotates, a ball of the ball plunger comes into resilient contact with the select knob and engages in the dome type grooves of the select knob in a sequential manner, generating an operating sound.

According to the present invention, instead of a volume knob of the volume switch which adjusts the level of vibrations or shock, the select knob is fitted to the volume switch such that when the select knob is rotated by a user, the level is adjusted quickly in multiple stages, and the ball of the ball plunger engages in the dome type grooves formed in the undersurface of the select knob at every level stage the user desires, thereby allowing the user to perceive whether or not the level has been adjusted to the desired level.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

The above and other objects, features and advantages of the present invention will be more clearly understood from the following detailed description when taken in conjunction with the accompanying drawings. Reference will now be made in greater detail to a preferred embodiment of the invention, an example of which is illustrated in the accompanying drawings.

However, the present invention is not limited to the embodiments described below, but may be embodied into a variety of different forms, so that embodiments of the invention are provided merely for illustrative purpose of the invention in order to allow a skilled person in the art to completely understand the scope of the present invention.

Therefore, embodiments and drawings described in the specification are merely the best examples of preferred implementations of the present invention and do not describe the entire technical scope of the present invention, so that at the time when the present invention was filed there may exist various equivalents and modifications that they could be replaced with.

Now the embodiments of the invention will be described with reference to the accompanying drawings.

Figure 2:
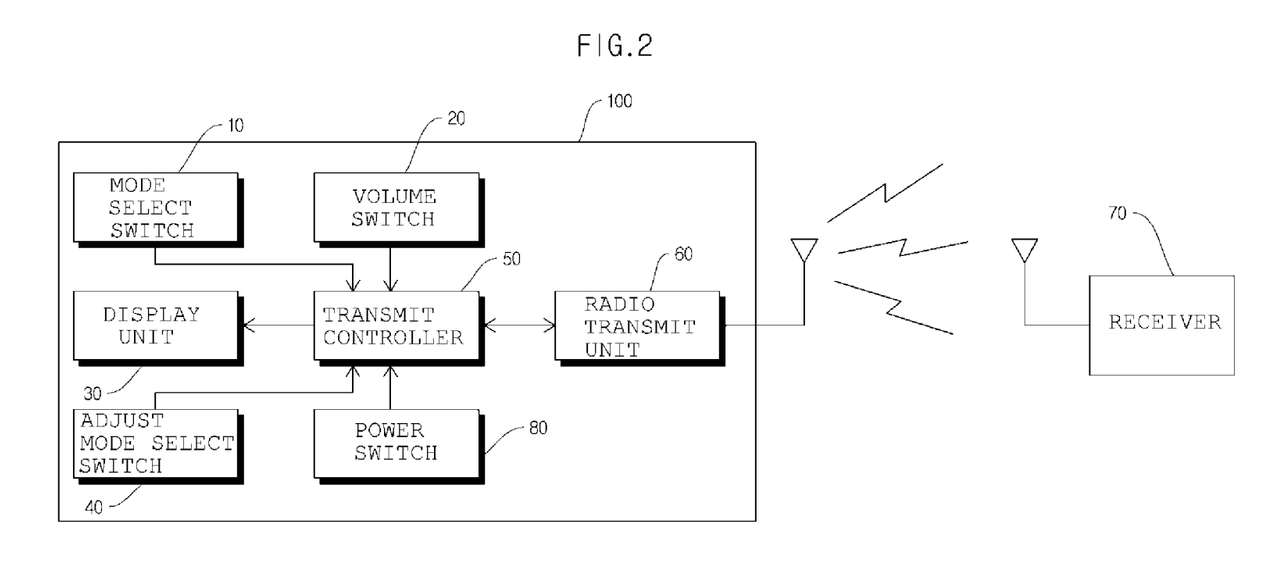
FIG. 2 is a block diagram showing the construction of a transmitter for an animal training device according to an embodiment of the present invention.

FIG. 2 is a block diagram showing the construction of a transmitter for an animal training device according to an embodiment of the present invention.

The transmitter 100 for an animal training device includes: a mode selection switch 10 selecting the mode from between vibrations, shock, or illumination; a volume switch 20 setting the level of vibrations or shock output from a receiver 70; a display unit 30 displaying the level of vibrations or shock set by the volume switch 20; an adjust mode select switch 40 selectively switching either an intensity selection mode, which sets the level of vibrations or shock set by the volume switch 20 in multiple stages, or a rheostatic mode, which sets the level of vibrations or shock set by the volume switch 20 in a digitalized value; a radio transmit unit 60 transmitting a radio signal, including data about the level of vibrations or shock currently set by the volume switch 20, to the receiver 70; a transmit controller 50 controlling the display unit 30 to display, in intensity selection mode or the rheostatic mode, the level of vibrations or shock currently set by the volume switch 20 according to intensity selection mode or rheostatic mode selected by the adjust mode select switch 40, and controlling the transmission of the radio transmit unit 60, to the receiver 70, of the radio signal including the data about the level of vibrations or shock currently set by the volume switch 20; and a power switch 80 supplying or cutting off power to the transmitter 100.

Figure 3:
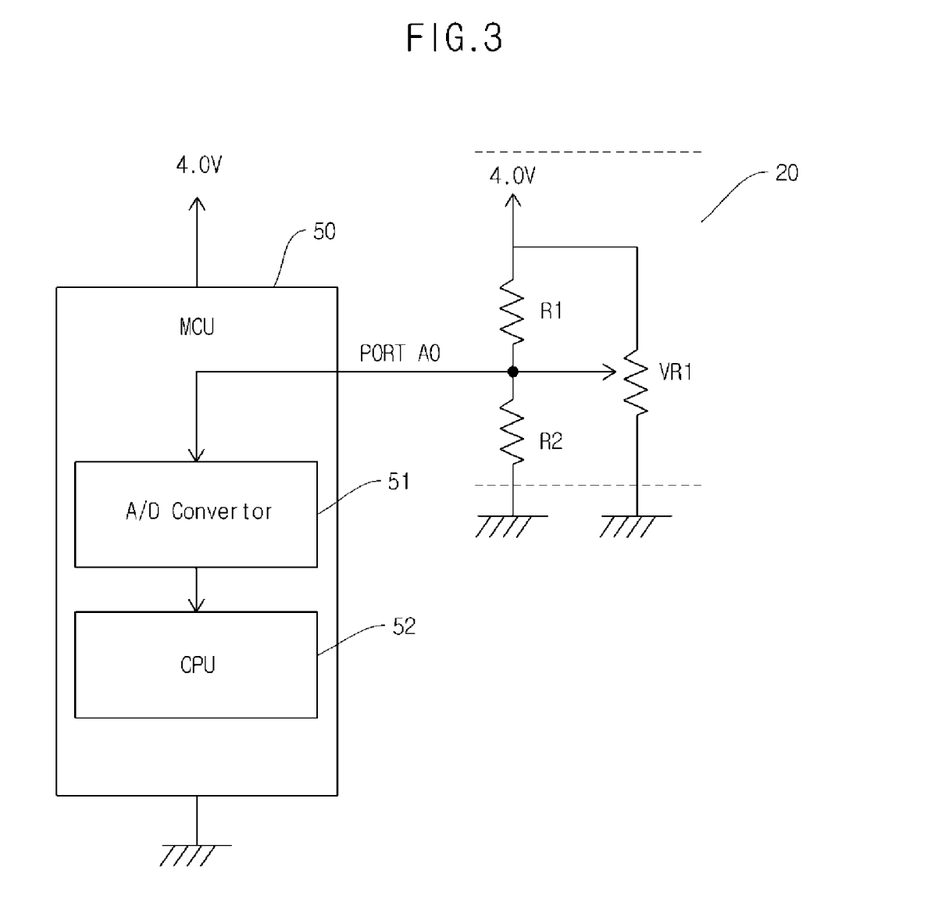
FIG. 3 is an exemplary circuit diagram showing the connection state between a transmit controller and a volume switch of the transmitter.

FIG. 3 is an exemplary circuit diagram showing the state of the connection between a transmit controller and a volume switch of the transmitter.

A variable terminal of the volume switch 20 is connected to a 4V reference voltage by partial resistances R1 and R2. Furthermore, a voltage signal output for setting the level of vibrations or shock of the volume switch 20 is input to the transmit controller 50 via a port A0, is converted into a digitalized value by an AD converter 51, and then input to a central processing unit (CPU) 52.

The CPU 52 displays, on the display unit 30, voltage input to the volume switch 20 in any one stage of 0~8 stages or a value of 0~255 according to intensity selection mode or rheostatic mode, which is selected by the adjust mode select switch 40.

When the adjust mode select switch 40 is set to intensity selection mode, the CPU 52 converts a voltage value input from the volume switch 20 into a digital value at the A/D converter 51, compares the digital value (0~255) with 8-stage ranges, which are predetermined as shown in Table 1, and converts the digital value into a set level value corresponding to a specific stage range, and displays the set level value as any one of 0~8 stages ranges on the display unit 30.

TABLE 1

| | Digital Stage Ranges | | | | | | | |
|---|---|---|---|---|---|---|---|---|
| | 0~4 | 5~35 | 36~65 | 66~95 | 96~120 | 121~150 | 151~200 | 201~240 | 241~255 |
| Set Level Value | 0 | 46 | 64 | 74 | 98 | 128 | 166 | 200 | 255 |
| Stages | 0 | 1 | 2 | 3 | 4 | 5 | 6 | 7 | 8 |

When the adjust mode select switch 40 is set to rheostatic mode, the CPU 52 converts a voltage value input from the volume switch 20 into a digitalized value at the A/D converter 51, and display the digital (binary) value on the display unit 30 in a value (0~255) in decimal format.

Figure 4:
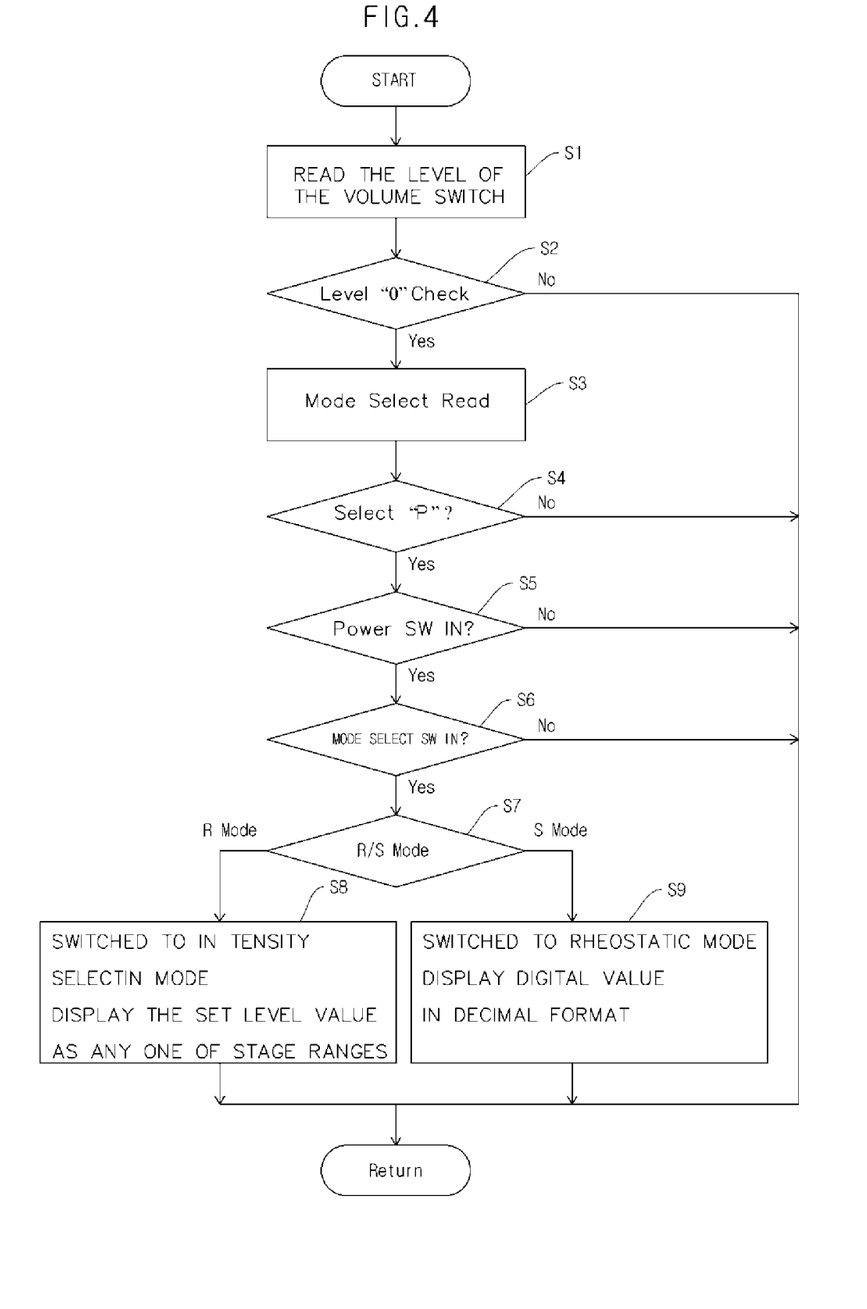
FIG. 4 is a flow chart showing an exemplary manner of switching the transmitter between an intensity selection mode and a rheostatic mode.

FIG. 4 is a flow chart showing an exemplary method of switching the transmitter between intensity selection mode and rheostatic mode.

In the present program of the method, if the adjust mode select switch 40 is accidently operated when the main program of the method is being executed, the main program is interrupted and the present program is then executed.

Switching between intensity selection mode and rheostatic mode is done while the volume switch 20 is at level "0". This is because if the switching is performed when the volume switch 20 is not at level "0", as the switching is performed, a change would have to be made to many parameters of the respective elements of the transmitter, making it complex.

In step S1, the level of the volume switch 20 is read, and in step S2, it is determined whether the level of the volume switch 20 is "0" or not, and if not, the process returns to the main program.

If the level of the volume switch 20 is determined to be "0" in step S2, the process proceeds to step S3, in which the mode selected by the mode select switch 10 is read, and the process proceeds to step S4. Then, if it is determined that the mode selected by the mode select switch 10 is not "P (Pager or vibrations) mode", the process returns to the main program, and if the selected mode is determined to be "P mode", the process proceeds to step S5.

That is, the configuration is such that when the mode select switch 10 is in "P mode", intensity selection mode and rheostatic mode are switched between. This is to prevent the above two modes from being switched between when a user accidently operates the adjust mode select switch 40. Thus, in another mode such as shock mode, such switching between intensity selection mode and rheostatic mode can occur. However, the invention is not particularly restricted to "P mode".

Step S5 determines whether an input signal is input to the power switch 80 or not; if not, the process returns to the main program, and if yes, the process proceeds to step S6. Since this also prevents the two above modes from being switched between when a user accidently operates the adjust mode select switch 40, another separate switch can replace the power switch 80.

In step S6, it is determined whether an input signal is input from the adjust mode select switch 40 or not; if not, the process returns to main program, and if yes, the process proceeds to step S7.

In step S7, if an input signal is input from the power switch 80 and the adjust mode select switch 40 at the same time, the adjust mode can be switched in a toggle manner. That is, if it is determined that the adjust mode select switch 40 is currently set to intensity selection mode, the level adjust mode is switched to rheostatic mode in step S9, and if the adjust mode select switch 40 is currently set to rheostatic mode, the level adjust mode is switched to intensity selection mode in step S8. After the level adjust mode has been switched as such, the process returns to the main program.

Figure 5A:
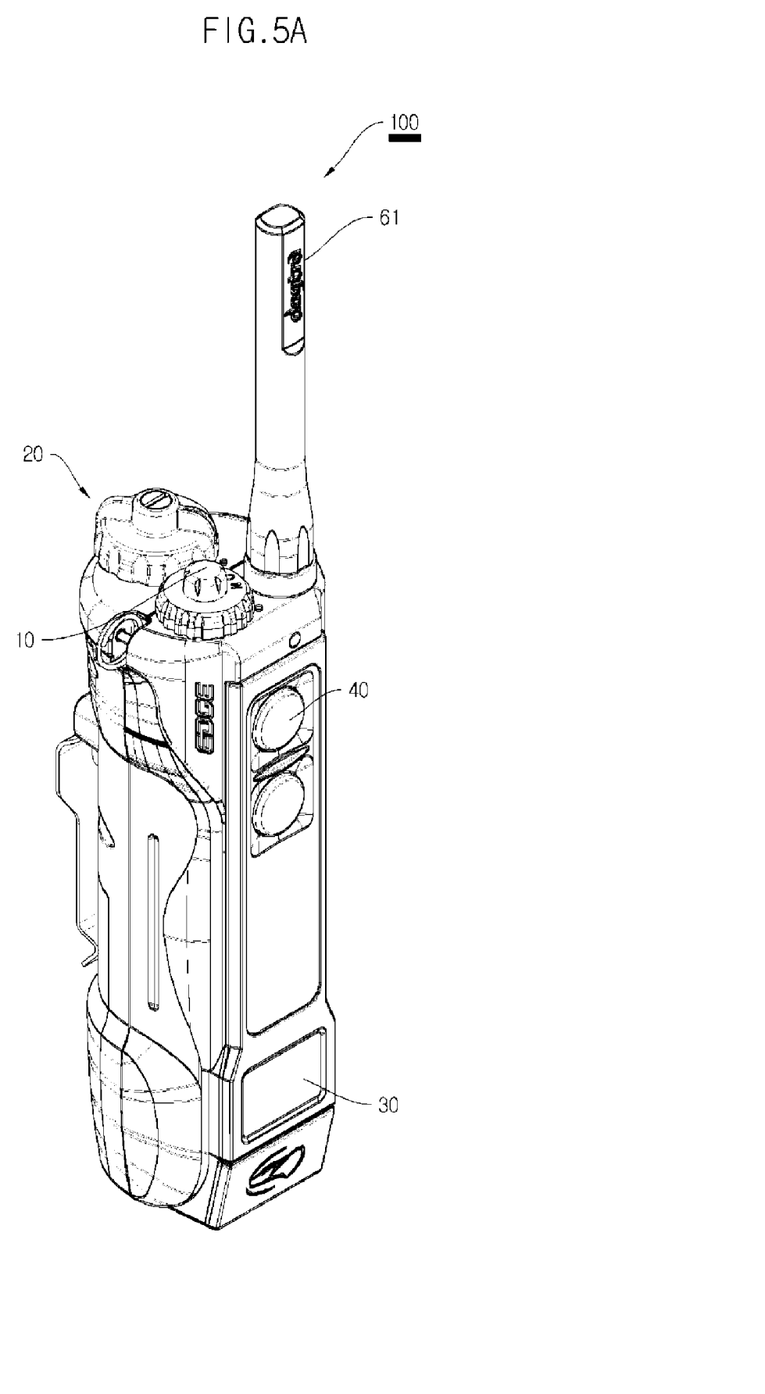
FIGS. 5A and 5B respectively are a front perspective view and a rear perspective view showing the external construction of the transmitter.
Figure 5B:
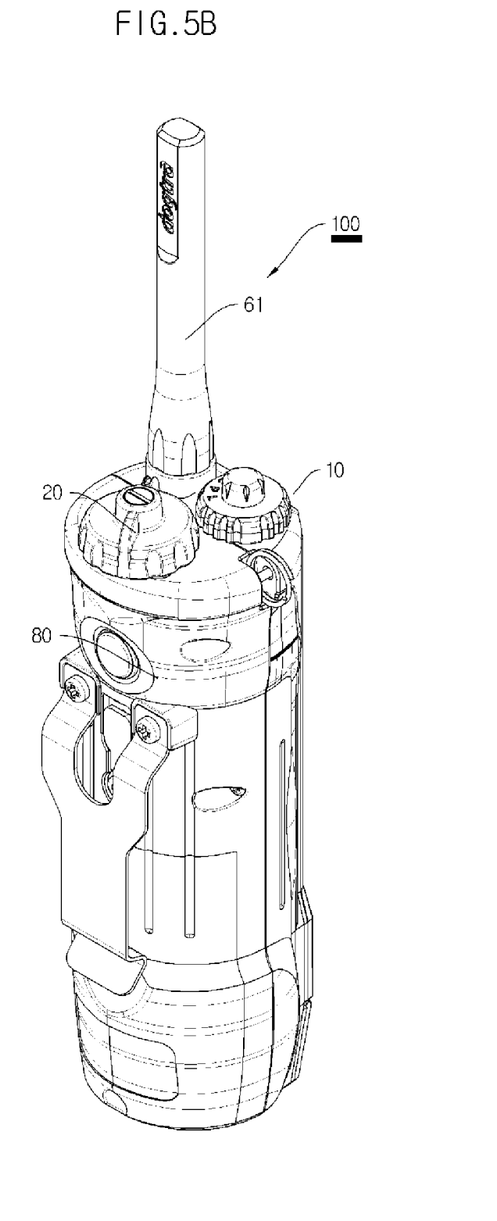

FIGS. 5A and 5B respectively are a front perspective view and a rear perspective view showing the external construction of the transmitter.

In the transmitter 100 for an animal training device, as shown in FIGS. 5A and 5B, the adjust mode select switch 40 is mounted on the front and upper portion of the main body of the transmitter, the power switch 80 is mounted on the rear and upper portion of the main body opposite the adjust mode select switch 40, and the volume switch 20, the mode select switch 10 for selecting the mode of vibrations or shock, illumination, etc, and an antenna 61 are mounted on the upper portion of the main body.

The volume switch 20 may be provided with a select knob 25, which enables the volume switch to be an 8-stage step switch that applies vibrations or shock in multiple stages (e.g. 8 stages), and otherwise the volume switch may be provided with a volume knob 26 which enables the volume switch to be a variable volume switch.

When the volume switch 20 is intended to be used as an 8-stage selection switch while fitting the select knob 25 thereto, as described above, a user should set the level of the volume switch 20 to "0", set the mode select switch 10 to "P mode", and operate the power switch 80 and the adjust mode select switch 40 to switch the adjust mode to intensity selection mode.

Figure 6:
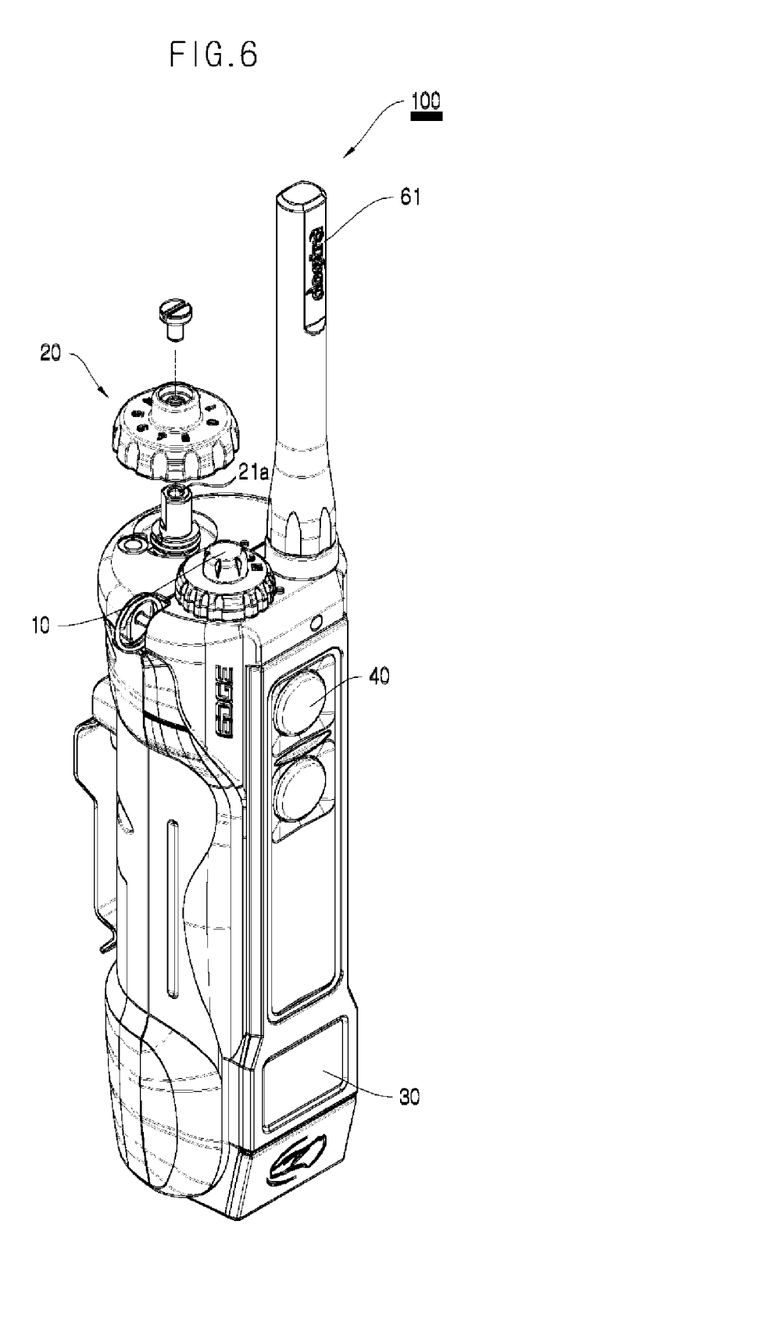
FIG. 6 is an exploded perspective view showing the construction of the transmitter in which a select knob is assembled to the volume switch.

FIG. 6 is an exploded perspective view showing the construction of the transmitter in which the select knob is assembled to the volume switch.

As shown in the figure, the select knob 25 is assembled to the volume switch in such a manner that in the state of the volume switch being fastened to the main body of the transmitter, the select knob 25 is fitted at its opening 25a around a knob axis 21 of the volume switch, which is fastened to the upper portion of the main body, and a fixing screw 23 is finally fastened to the knob axis through the opening 25a of the select knob 25 and a screw hole 21a of the knob axis 21.

For easy assembly of the select knob 25 and the knob axis 21 using the fixing screw 23, the cylindrical knob axis 21 is partially cut into a facet, and the opening 25a of the select knob 25 inserted around the knob axis is also partially cut to provide a faceted surface corresponding to the facet of the knob axis, so that when the select knob and the knob axis are assembled the two corresponding facets and the faceted surface are matched to each other, the assembly will be easy to assemble.

This also prevents a user from accidentally mis-assembling the knob axis 21 and the select knob 25, as well as ensuring that they are easy to assembly together.

Figure 7:
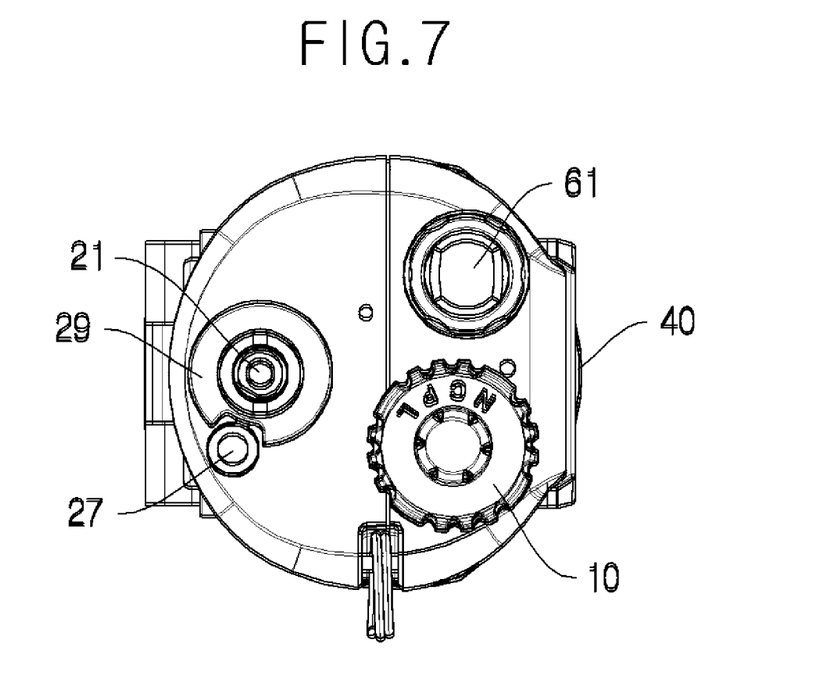
FIG. 7 is a plan view showing the state in which the select knob is removed from the upper surface of a main body of the transmitter.
Figure 8:
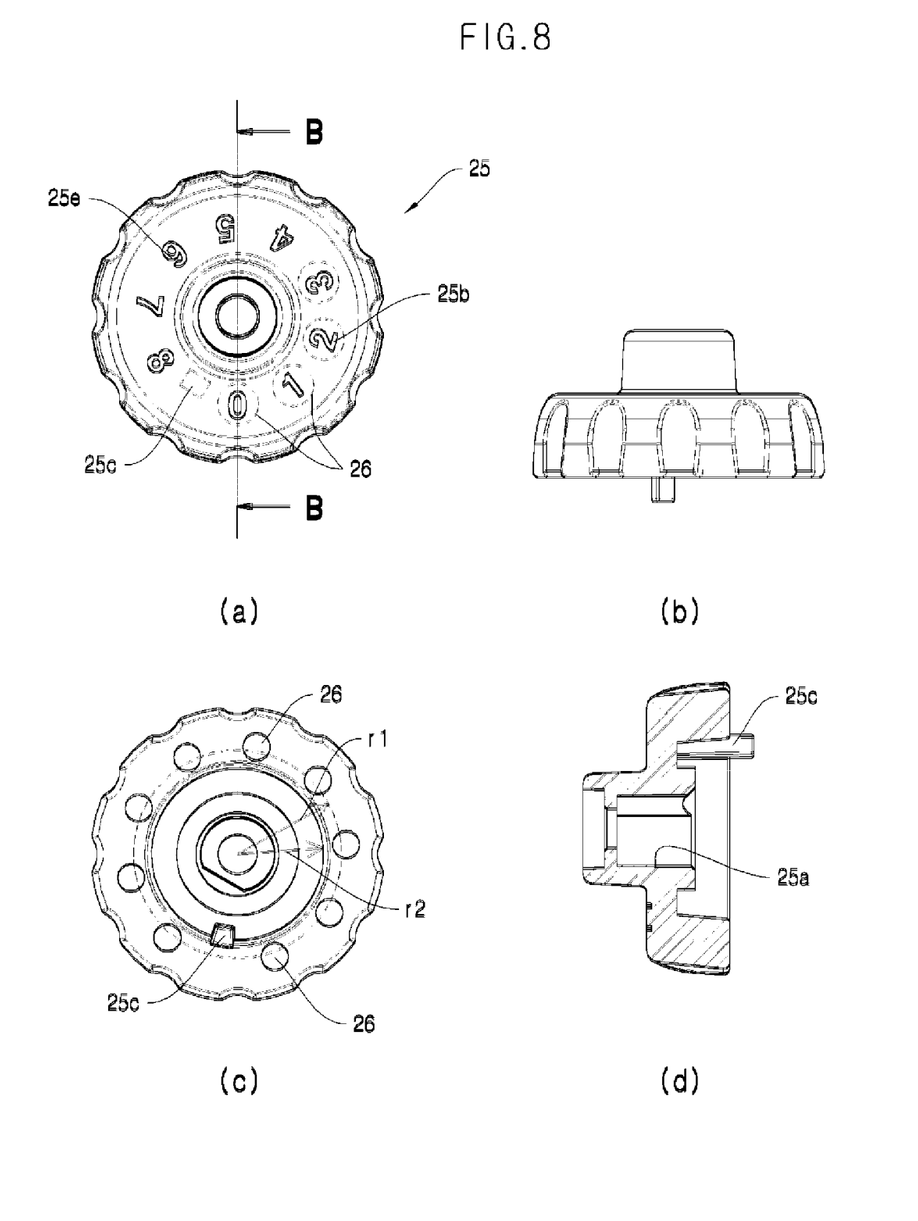
FIG. 8A to 8D respectively are a plan view, a front view, a bottom view, and a cross-sectional view taken along line B-B showing the select knob.
Figure 9:
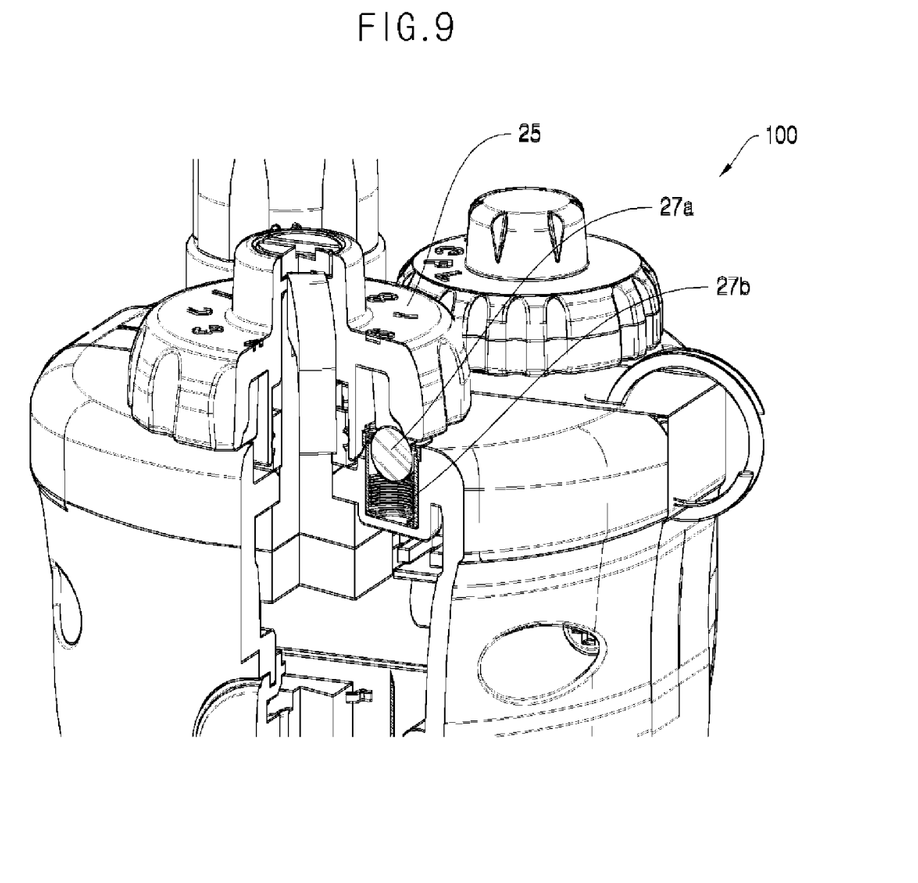
FIG. 9 is a partially cut-out perspective view showing the state in which the select knob and a ball plunger are assembled to the upper surface of the main body of the transmitter.
Figure 10:
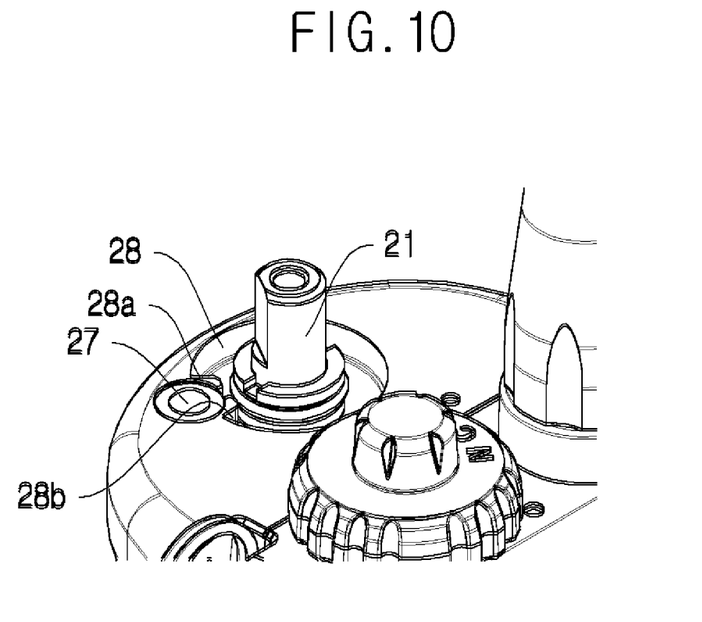
FIG. 10 is a perspective view showing the surrounding of a knob axis of the volume switch with the select knob removed from the upper surface of the main body of the transmitter.

FIG. 7 is a plan view showing the state in which the select knob is removed from the upper surface of a main body of the transmitter, FIG. 8A to 8D respectively are a plan view, a front view, a bottom view, and a cross-sectional view taken along line B-B showing the select knob, FIG. 9 is a partially cut-out perspective view showing the state in which the select knob and a ball plunger are assembled to the upper surface of the main body of the transmitter, and FIG. 10 is a perspective view showing the surrounding of a knob axis of the volume switch with the select knob removed from the upper surface of the main body of the transmitter.

The select knob 25 is configured such that a ball plunger (see FIG. 9), which is inserted into the upper surface of the main body of the transmitter 100, is brought into contact with 9 dome type grooves 28 (see FIG. 8C), which are formed in an undersurface of the select knob.

As shown in FIG. 9, the ball plunger 27 is configured so that a ball 27a resiliently moves up and down by means of a spring 27b mounted under the ball. Further, as shown in FIGS. 8A and 8B, the dome type grooves 26, which partially cover the upper portion of the ball, are circumferentially formed in the undersurface of the select knob 25 around the knob opening 25a with regular intervals, with the level number 25b recorded on the upper surface of the select knob at positions corresponding to those of the grooves 26. Here, if the volume level has 0~8 stages, a total of nine dome type grooves 26 are formed.

Thus, when the select knob 25 is rotated while being fitted to the knob axis 21 of the volume switch, the ball 27a of the ball plunger 27 engages in the dome type grooves 26 of the select knob 25, so that the select knob can be rotated to and stopped at the volume level that the user wants to put it at.

In addition, as shown in FIGS. 8A and 8B, a knob protrusion 25c is formed on an undersurface of the select knob 25 at a position somewhat closer to the opening 25a of the select knob 25 than the position of the dome type grooves 26. When the select knob 25 is rotated, the knob protrusion also rotates along a circular recess 28 having a diameter smaller than that of a circle made by the circumferentially formed dome type grooves 26. The knob protrusion 25c is located near the volume level of "8".

Specifically, as shown in FIG. 10, the circular recess 28 is configured to have a stopper which is formed in an upper surface of the main body of the transmitter 100 around the knob axis 21 of the volume switch 20 such that in the circular recess 28, when the select knob 25 is able to rotate in one direction to the maximum level, e.g. 8$^{th}$ level, at one end 28b of the stopper, and to rotate in the other direction to the minimum level, e.g. zero level, at the other end 28a of the stopper.

Thereby, the select knob 25 is prevented from rotating endlessly, the volume switch 20 is adjusted within a certain range, and when the select knob 25 is fastened using the fixing screw 23, although a user further fastens the fixing screw 23 using a fastening tool (e.g. a driver and the like), even after the fixing screw 23 has been completely fastened, the select knob 25 does not rotate any more, but is stopped at the end 28a of the stopper.

In addition, when the select knob 25 rotates, the ball 27a of the ball plunger 27 enters the dome type grooves 26 of the select knob 25, generating an operating sound, which allows a user to know that the select knob 25 precisely set the volume level.

That is, the operating sound is generated in such a manner that when the ball 27a of the ball plunger 27 enters the dome type grooves 26 of the select knob 25, the ball 27a resiliently moves up by means of the restoring force of the spring 27b, coming into contact with the select knob 25 and generating the operating sound.

Figure 11:
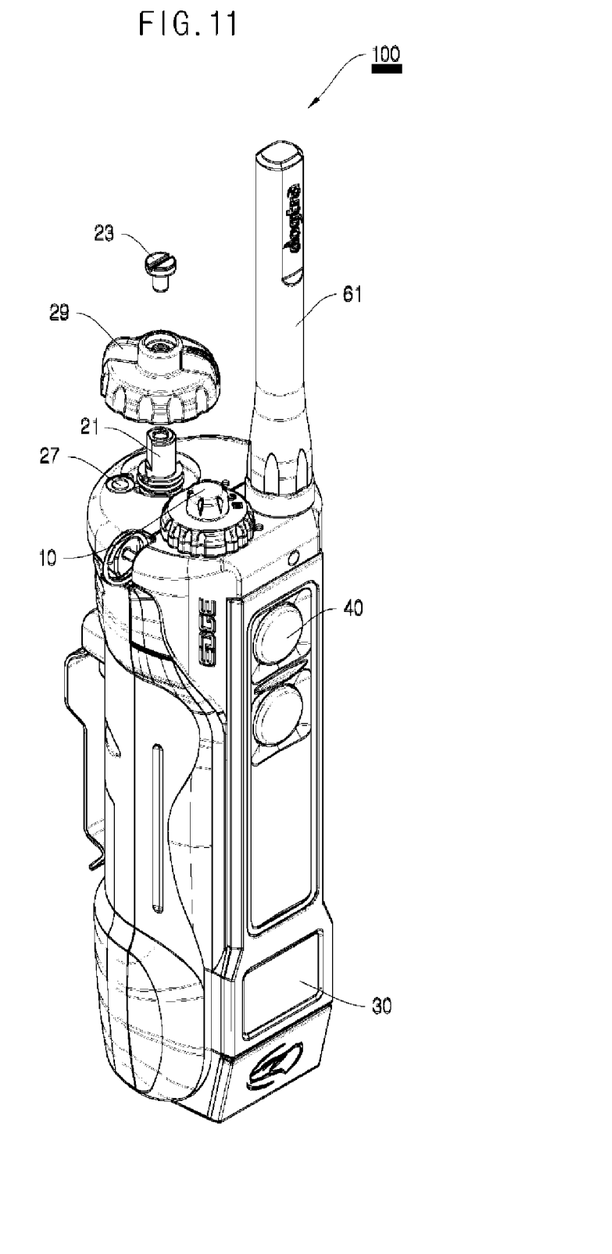
FIG. 11 is an exploded perspective view showing the state in which a volume knob is to be assembled to the volume switch of the transmitter.

FIG. 11 is an exploded perspective view showing the state in which a volume knob is to be assembled to the volume switch of the transmitter, and FIGS. 12A to 12D respectively are a plan view, a front view, a bottom view, and a cross-sectional view taken along line A-A showing the volume knob.

Figure 12:
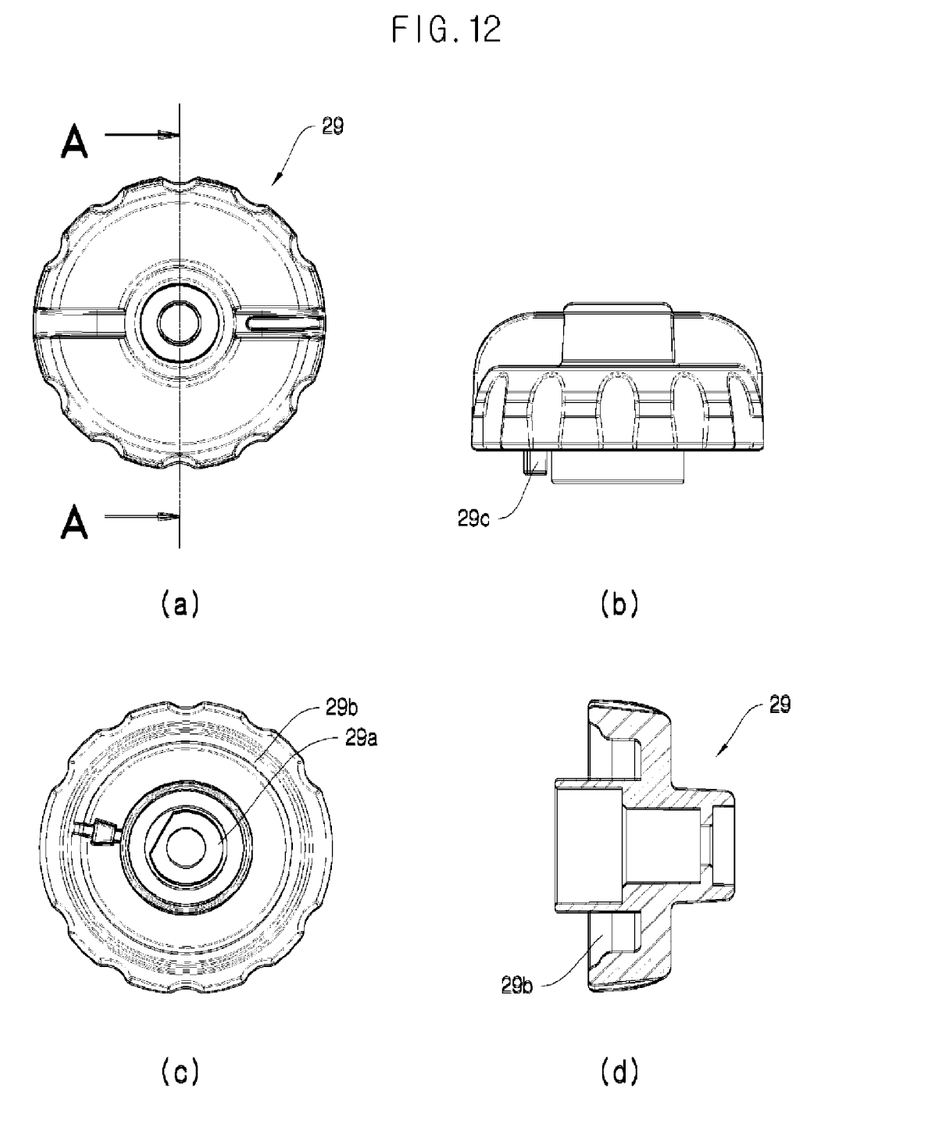
FIGS. 12A to 12D respectively are a plan view, a front view, a bottom view, and a cross-sectional view taken along line A-A showing the volume knob.

In the case where a volume knob 29 is fastened to the knob axis 21 of the volume switch using the fixing screw 23, when the volume level is changed, the volume level is changed not in a stepwise manner, but smoothly. As shown in FIGS. 12C and 12D, a circular cavity 29b is formed in the volume knob 29 at a position where the ball plunger 27 is located, so that the volume knob 29 rotates freely without any interference or contact with the ball plunger 27.

Further, as shown in FIGS. 12B and 12C, a knob protrusion 29c is formed on an undersurface of the volume knob 29 at a position somewhat closer to the center of the volume knob than the position of the dome type grooves 26 of the select knob 25. Thus, the knob protrusion 29c rotates along the circle formed by the circular recess 28 shown in FIG. 10, a diameter of which is smaller than that made by the circumferentially formed dome type grooves 26.

Thus, when the volume knob 29 is rotated to the maximum level in one direction and the minimum level in the other direction, the knob protrusion 29c rotates along the circular recess 28 to the maximum level and is stopped at one end 28b of the stopper of the circular recess, and to the minimum level and is stopped at the other end 28a of the stopper of the circular recess, thereby forming a defined rotating range.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A transmitter for an animal training device comprising:
   a mode selection switch selecting a mode between vibration mode, shock mode, or illumination mode;
   a volume switch setting a level of vibrations or shock output from a receiver;
   a display unit displaying the level of vibrations or shock set by the volume switch;
   an adjust mode select switch selectively switching either an intensity selection mode, which sets the level of vibrations or shock set by the volume switch in multiple stages, or a rheostatic mode, which sets the level of vibrations or shock set by the volume switch to a digitized value;
   a radio transmit unit transmitting a radio signal, including data about the level of vibrations or shock currently set by the volume switch, to the receiver;
   a transmit controller controlling the display unit to display, in the intensity selection mode or the rheostatic mode, the level of vibrations or shock currently set by the volume switch according to the intensity selection mode or rheostatic mode selected by the adjust mode select switch, and controlling the radio transmit unit to transmit, to the receiver, the radio signal including the data about the level of vibrations or shock currently set by the volume switch; and,
   a power switch supplying or cutting off power to the transmitter.

2. The transmitter for an animal training device according to claim 1, wherein when the adjust mode select switch is set to the intensity selection mode, the transmit controller converts a voltage value input from the volume switch into a digital value, compares the digital value with a plurality of predetermined multi-stage ranges and converts the digital value into a set level value corresponding to a specific stage range, and displays the set level value on the display unit.

3. The transmitter for an animal training device according to claim 2, wherein the adjust mode select switch is switched to either the intensity selection mode or rheostatic mode when the mode select switch is set to the vibration mode in the state of the volume switch having the level of "0" and, further the adjust mode select switch and a power switch are operated at the same time.

4. The transmitter for an animal training device according to claim 1, wherein when the adjust mode select switch is set to the rheostatic mode, the transmit controller converts a voltage value input from the volume switch into a digital value, and displays the digital value on the display unit in a decimal format.

5. The transmitter for an animal training device according to claim 4, wherein the adjust mode select switch is switched to either the intensity selection mode or rheostatic mode when the mode select switch is set to the vibration mode in the state of the volume switch having the level of "0" and, further the adjust mode select switch and a power switch are operated at the same time.

6. The transmitter for an animal training device according to claim 1, wherein the adjust mode select switch is switched to either the intensity selection mode or rheostatic mode when the mode select switch is set to the vibration mode in the state of the volume switch having the level of "0" and, further the adjust mode select switch and a power switch are operated at the same time.

7. The transmitter for an animal training device according to claim 1, wherein the volume switch is configured to be mounted on an upper surface of a main body of the transmitter such that a ball plunger is mounted near the volume switch in such a manner as to fixedly engage in a plurality of dome type grooves formed in an undersurface of a select knob.

8. The transmitter for an animal training device according to claim 7, wherein a knob protrusion is provided on an undersurface of the select knob and a circular recess having a stopper is formed in an upper surface of the main body of the transmitter around an axis of the knob of the volume switch such that in the circular recess, the select knob is able to rotate in one direction to a maximum level at one end of the stopper, and to rotate in the other direction to a minimum level at the other end of the stopper.

9. The transmitter for an animal training device according to claim 7, wherein the ball plunger is configured such that when the select knob rotates, a ball of the ball plunger comes into resilient contact with the select knob and engages in the dome type grooves of the select knob in a sequential manner, generating an operating sound.

* * * * *